(12) United States Patent
Xiao

(10) Patent No.: US 11,106,075 B2
(45) Date of Patent: Aug. 31, 2021

(54) DISPLAY MODULE AND ELECTRONIC DEVICE

(71) Applicant: Wuhan China Star Optoelectronics Technology Co., Ltd., Wuhan (CN)

(72) Inventor: Shiyuan Xiao, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/753,780

(22) PCT Filed: Jun. 5, 2019

(86) PCT No.: PCT/CN2019/090153
§ 371 (c)(1),
(2) Date: Apr. 5, 2020

(87) PCT Pub. No.: WO2020/232754
PCT Pub. Date: Nov. 26, 2020

(65) Prior Publication Data
US 2020/0371394 A1 Nov. 26, 2020

(30) Foreign Application Priority Data

May 21, 2019 (CN) .......................... 201910421634.7

(51) Int. Cl.
*G02F 1/13357* (2006.01)
*G02F 1/1335* (2006.01)
*G02F 1/1333* (2006.01)
*F21V 8/00* (2006.01)

(52) U.S. Cl.
CPC ..... *G02F 1/133512* (2013.01); *G02B 6/0055* (2013.01); *G02F 1/133308* (2013.01); *G02F 1/133314* (2021.01); *G02F 1/133317* (2021.01)

(58) Field of Classification Search
None
See application file for complete search history.

(56) References Cited

U.S. PATENT DOCUMENTS

| | | | | |
|---|---|---|---|---|
| 2006/0098134 | A1* | 5/2006 | Park | G06F 1/1616 349/58 |
| 2012/0268686 | A1* | 10/2012 | Lee | G02F 1/13452 349/59 |
| 2014/0133174 | A1* | 5/2014 | Franklin | G02B 6/0088 362/606 |
| 2015/0002785 | A1* | 1/2015 | Huang | H05K 9/0045 349/65 |

* cited by examiner

Primary Examiner — James A Dudek

(57) ABSTRACT

The present invention provides a display module and an electronic device, and the display module includes a backlight module, with a light source disposing on one side of a light guide plate; a liquid crystal display panel; a housing, wherein an interior of the housing accommodates the backlight module and the liquid crystal display panel, a light-absorbing layer is disposed at least on an inner surface of a first side of the housing, and a position of the light-absorbing layer corresponds at least to a position of the light guide plate, and wherein the first side is a side facing the light source and distant from the light source.

16 Claims, 4 Drawing Sheets

DISPLAY MODULE AND ELECTRONIC DEVICE

RELATED APPLICATIONS

This application is a National Phase of PCT Patent Application No. PCT/CN2019/090153 having International filing date of Jun. 5, 2019, which claims the benefit of priority of Chinese Patent Application No. 201910421634.7 filed on May 21, 2019. The contents of the above applications are all incorporated by reference as if fully set forth herein in their entirety.

FIELD AND BACKGROUND OF THE INVENTION

The present invention relates to the technical field of display, and especially to a display module and an electronic device.

With continuing development of display modules, borders of display modules become narrower and narrower, and therefore they are widely applied to electronic products.

A conventional display module includes a backlight module, a housing, etc., and the backlight module includes a light guide plate and a reflector. A light source is usually disposed on one side of the backlight module, but due to a shorter light path between one side of the backlight module distant from the light source and the housing, which leads to more light at this place, a portion of the display module has greater brightness, and therefore when watching at wider visual angles, a phenomenon of light leakage tends to occur and diminishes display effect.

Therefore, it is necessary to provide a display module and an electronic device to overcome the existing problems in the conventional technology.

SUMMARY OF THE INVENTION

The present invention is to provide a display module and an electronic device that prevent a phenomenon of light leakage when watching at wider visual angles and increase display effect.

In order to overcome the above-mentioned technical problems, the present invention provides a display module that includes a backlight module including a light guide plate and a light source, wherein the light source is disposed on one side of the light guide plate; a liquid crystal display panel; and a housing, wherein an interior of the housing accommodates the backlight module and the liquid crystal display panel, a light-absorbing layer is disposed at least on an inner surface of a first side of the housing, and a position of the light-absorbing layer corresponds at least to a position of the light guide plate, and wherein the first side is a side facing the light source and distant from the light source.

The present invention further provides an electronic device that includes the above-mentioned display module.

A display module and an electronic device according to the present invention dispose a light-absorbing layer at least at an inner surface of a first side of the housing, given the position of the light-absorbing layer corresponds at least to that of the light guide plate, and because the backlight module has more light on the side distant from the light source, hence disposing a light-absorbing layer at this place can decrease the amount of light that gathers, which prevents a phenomenon of light leakage when watching at wider visual angles and increases display effect.

DESCRIPTION OF SPECIFIC EMBODIMENTS OF THE INVENTION

Figure 1:
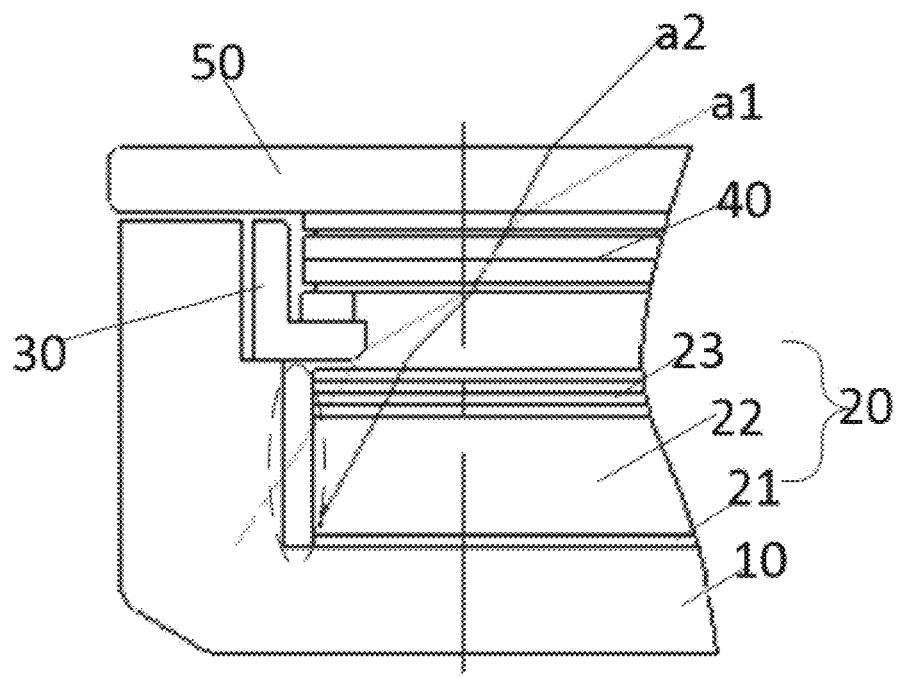
FIG. 1 is a partial sectional view of a conventional display module.

The embodiments of the present invention are described in detail hereinafter. Examples of the described embodiments are given in the accompanying drawings. In the description of the present invention, it should be understood that terms such as "upper," "lower," "front," "rear," "left," "right," "inside," "outside," "side," as well as derivative thereof should be construed to refer to the orientation as shown in the drawings under discussion. These relative terms are for convenience of description and shall not be construed as causing limitations to the present invention. The identical reference numerals constantly denote the similar elements.

As shown in FIG. 1, a conventional display module includes a housing 10, a backlight module 20, a middle frame 30, a liquid crystal display panel 40, and a cover plate 50. The liquid crystal display panel 40 is located in the middle frame 30, and the middle frame 30 and the backlight module 20 is located in the housing 10.

A light path in the dotted box is shorter, which leads to a phenomenon of light leakage when watching at wider visual angles (a1, a2). In one embodiment, a1 is 60 degrees and a2 is 45 degrees.

Figure 2:
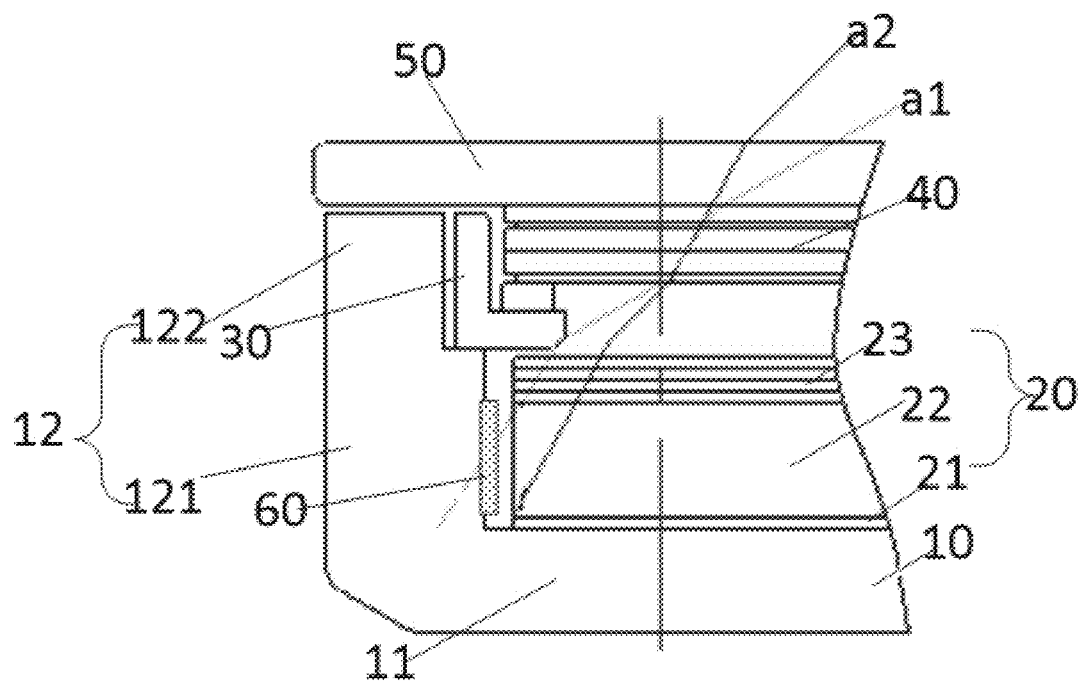
FIG. 2 is a partial sectional view of a display module according to the first embodiment of the present invention.

Referring to FIG. 2, FIG. 2 is a partial sectional view of a display module according to the first embodiment of the present invention.

A display module according to the present embodiment includes a housing 10, a backlight module 20, a light source (not shown), a liquid crystal display panel 40, and besides can further include a middle frame 30 and a cover plate 50.

An interior of the housing 10 accommodates the backlight module 20 and the liquid crystal display panel 40, that is, the housing 10 encloses the backlight module 20 and the middle frame 30 from outside. Wherein, the housing 10 includes a bottom plate 11 and a side wall 12. One end of the side wall 12 is connected to an end portion of the bottom plate 11, such as a lower end of the side wall 12 is connected to a left end or right end of the bottom plate 11, the side wall 12 is located on one side of the backlight module 20, the side wall 12 includes a first sub-wall 121 and a second sub-wall 122, and a width of the first sub-wall 121 is greater than a width of the second sub-wall 122. A position of the first sub-wall 121 corresponds to a position of the backlight module 20, and a height of the first sub-wall 121 is greater than a height of the backlight module 20.

The backlight module 20 includes a light guide plate 22, and besides can further include a reflector 21, a plurality of optical films 23, and a light source, wherein the light guide plate 22 and the optical films 23 are located in order on the reflector 21. The light source is disposed on one side of the light guide plate 22, and a light source located on a right side of the light guide plate 22 is illustrated in the present embodiment.

The middle frame 30 is located on the backlight module 20, the middle frame 30 is configured to accommodate and support the liquid crystal display panel 40, and a position of the liquid crystal display panel 40 corresponds to a position of the backlight module 20. Wherein, a bottom portion of the middle frame 30 abuts a top portion of the first sub-wall 121. A side wall of the middle frame 30 is located on an inner side of the second sub-wall 122.

The liquid crystal display panel 40 can include an array substrate, a color filter substrate, and a liquid crystal layer.

Wherein, the housing 10 has a first side, a second side, and a third side, wherein the first side is a side distant from the light source, and the first side faces the light source, and wherein the second side is a side near to the light source, that is, the first side and the second side are disposed facing each other. For example, the housing 10 includes a bottom plate and four side walls disposed around the periphery of the bottom plate, wherein the first side is the left side, the second side is the right side, and the third side is at least one of the upper and the lower side walls.

In one embodiment, a light-absorbing layer 60 is disposed on an inner surface of the first side of the housing 10, and a position of the light-absorbing layer 60 corresponds at least to a position of the light guide plate 22. For example, a light-absorbing layer 60 is disposed on an inner surface of the left side of the housing 10, that is, a light-absorbing layer 60 is coated on the inner surface of the left side of the housing 10.

In another embodiment, the light-absorbing layer 60 is also disposed on an inner surface of the second side of the housing 10. For example, a light-absorbing layer 60 is also disposed on an inner surface of the right side of the housing 10, that is, a light-absorbing layer 60 is coated on the inner surface of the right side wall of the housing 10.

In still another embodiment, the light-absorbing layer 60 is also disposed on an inner surface of a light-absorbing sub-portion of the third side of the housing 10, wherein the third side is connected to the first side and the second side respectively, a vertical distance between the light-absorbing sub-portion and the light source is greater than a preset value, and the preset value can be determined according to experiences.

For example, a light-absorbing layer is disposed at a portion within the upper side wall of the housing where a vertical distance (i.e. a horizontal distance) to the light source is greater than a preset value, in particular, a light-absorbing layer is disposed at the third side where distance is farther from the light source.

Wherein, a position of the light-absorbing layer 60 corresponds to a position of the light guide plate 22. Wherein, in one embodiment, in order to simplify manufacturing processes, the light-absorbing layer 60 is coated on an inner surface of the housing 10. In order to further increase display effect, wherein a thickness of the light-absorbing layer 60 is less than or equal to 0.1 millimeters.

The left side of the light guide plate, i.e. the side facing the light source, has the shortest light path, where hence having more light that gathers, and by disposing a light-absorbing layer on an inner surface of one side of the housing distant from the light source, with a position of the light-absorbing layer corresponding to a position of the light guide plate, the amount of light at this place can be decreased, which therefore prevents a phenomenon of light leakage when watching at wider visual angles (a1, a2) and increases display effect. Furthermore, the right side of the light source also has a shorter light path, where hence also having more light that gathers, and by also disposing a light-absorbing layer on an inner surface of one side of the housing near to the light source, a phenomenon of light leakage that occurs when watching at wider visual angles (a1, a2) can be better prevented, which increases display effect. Furthermore, above or below the left side of the light source also has a shorter light path, where hence also having more light that gathers, and by also disposing a light-absorbing layer on an inner surface of the light-absorbing sub-portion of the third side of the housing, a phenomenon of light leakage that occurs when watching at wider visual angles (a1, a2) can be further prevented, which further increases display effect.

Figure 3:
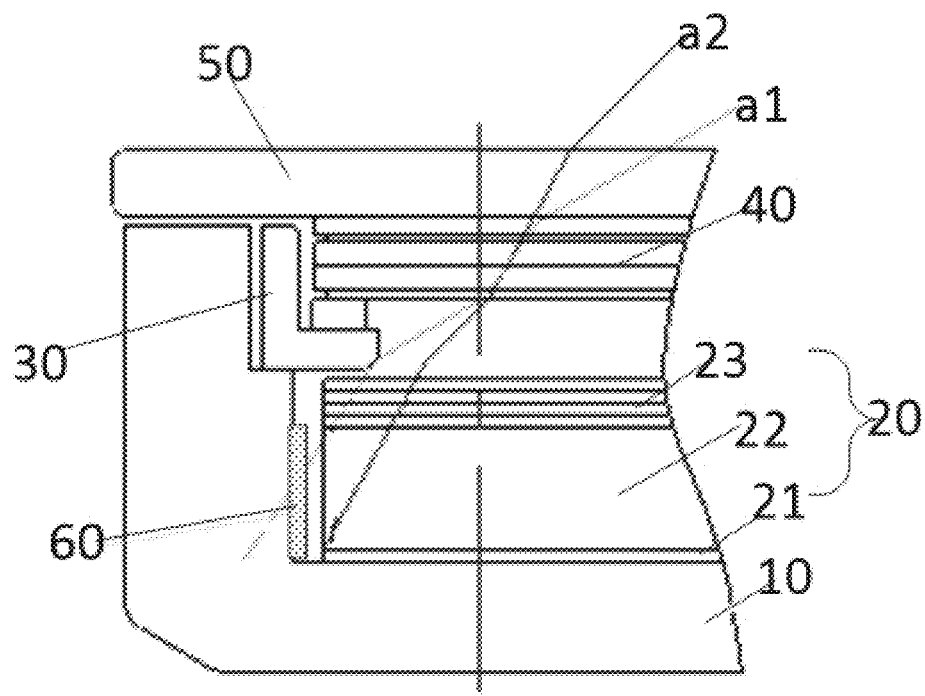
FIG. 3 is the first partial sectional view of a display module according to the second embodiment of the present invention.
Figure 4:
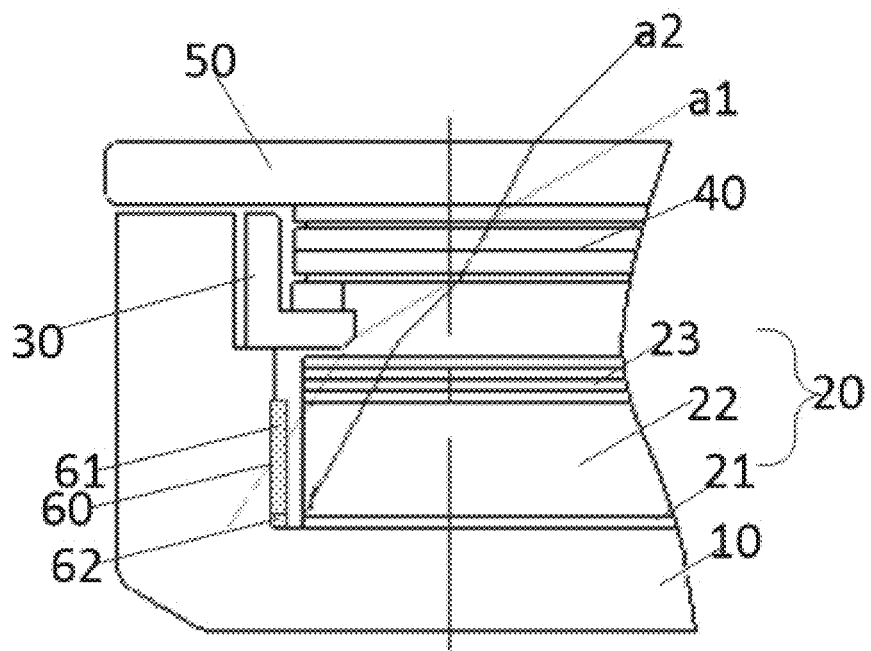
FIG. 4 is the second partial sectional view of a display module according to the second embodiment of the present invention.

Referring to FIG. 3 and FIG. 4, FIG. 3 is the first partial sectional view of a display module according to the second embodiment of the present invention.

As shown in FIG. 3 and FIG. 4, the difference between the present embodiment and the last embodiment is that the position of the light-absorbing layer 60 according to the present embodiment further corresponds to the position of the reflector 21. That is, the position of the light-absorbing layer 60 according to the present embodiment corresponds to the position of the light guide plate 22 and the reflector 21. On the basis of the first embodiment, because a light path of the position corresponding to the left side of the reflector is also longer in comparison with other positions, hence disposing a light-absorbing layer at the position corresponding to the left side of the reflector can increase uniformity of light, which further increases display effect.

Referring together to FIG. 4, the light-absorbing layer 60 includes a first sub-portion 61 and a second sub-portion 62, a position of the first sub-portion 61 corresponds to a position of the light guide plate 22, and a position of the second sub-portion 62 corresponds to a position of the reflector 21. In one embodiment, a light-absorbing rate of the first sub-portion 61 is equal to a light-absorbing rate of the second sub-portion 62. In another embodiment, in order to further increase uniformity of light, a light-absorbing rate of the first sub-portion 61 is greater than a light-absorbing rate of the second sub-portion 62. Because a light path of the position corresponding to the left side of the reflector is longer than a light path of the position corresponding to the left side of the light guide plate, hence configuring the light-absorbing rate of the second sub-portion's light-absorbing layer to be smaller can better increase uniformity of light, which better increases display effect.

Figure 5:
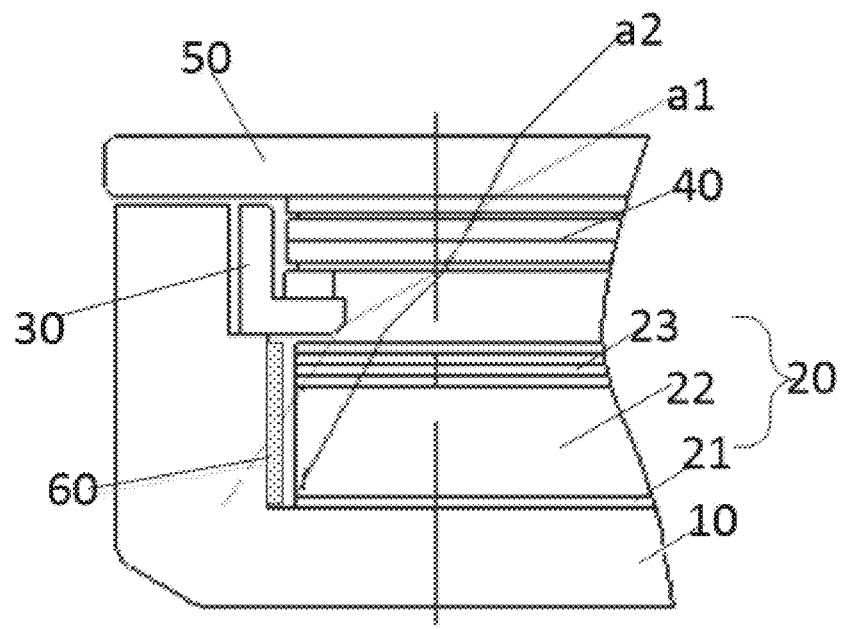
FIG. 5 is the first partial sectional view of a display module according to the third embodiment of the present invention.
Figure 6:
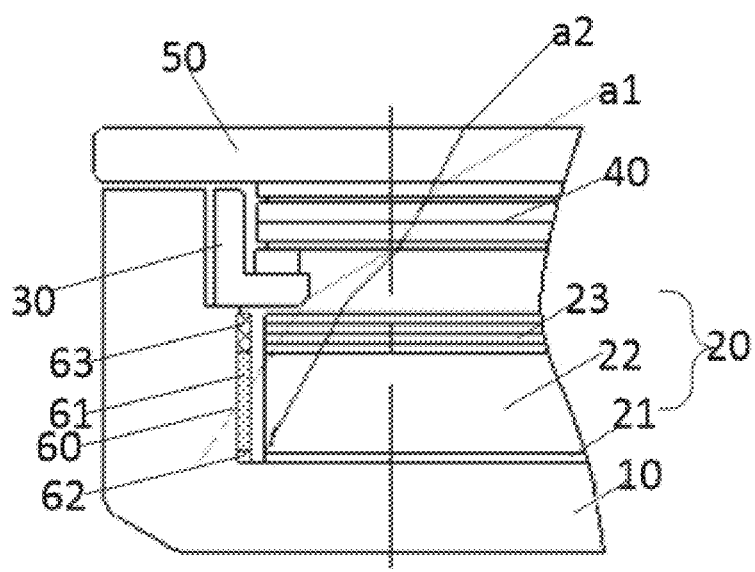
FIG. 6 is the second partial sectional view of a display module according to the third embodiment of the present invention.

Referring to FIG. 5 and FIG. 6, FIG. 5 is the first partial sectional view of a display module according to the third embodiment of the present invention.

As shown in FIG. 5 and FIG. 6, the difference between the present embodiment and the last embodiment is that the position of the light-absorbing layer 60 according to the present embodiment further corresponds to the position of the optical films 23. That is, the position of the light-absorbing layer 60 corresponds to the position of the whole backlight module 20. On the basis of the second embodiment, because a light path of the position corresponding to the left side of the optical films is also longer, hence disposing a light-absorbing layer at the position corresponding to the left side of the optical films can further increase uniformity of light, which further increases display effect.

Wherein, as shown in FIG. 6, the light-absorbing layer 60 further includes a third sub-portion 63, a position of the third sub-portion 63 corresponds to a position of the optical films 23, and the light-absorbing rate of the second sub-portion 62 is greater than or equal to a light-absorbing rate of the third sub-portion 63. It can be understood that the position of the third sub-portion 63 can also correspond to a position of the backlight module other than a position of the reflector and the light guide plate. Because a light path of the position corresponding to the left side of the optical films is longer than a light path of the position corresponding to the left side of the reflector, hence configuring the light-absorbing rate of the third sub-portion's light-absorbing layer to be less than or equal to the light-absorbing rate of the second sub-portion's light-absorbing layer can better increase uniformity of light, which better increases display effect.

Figure 7:
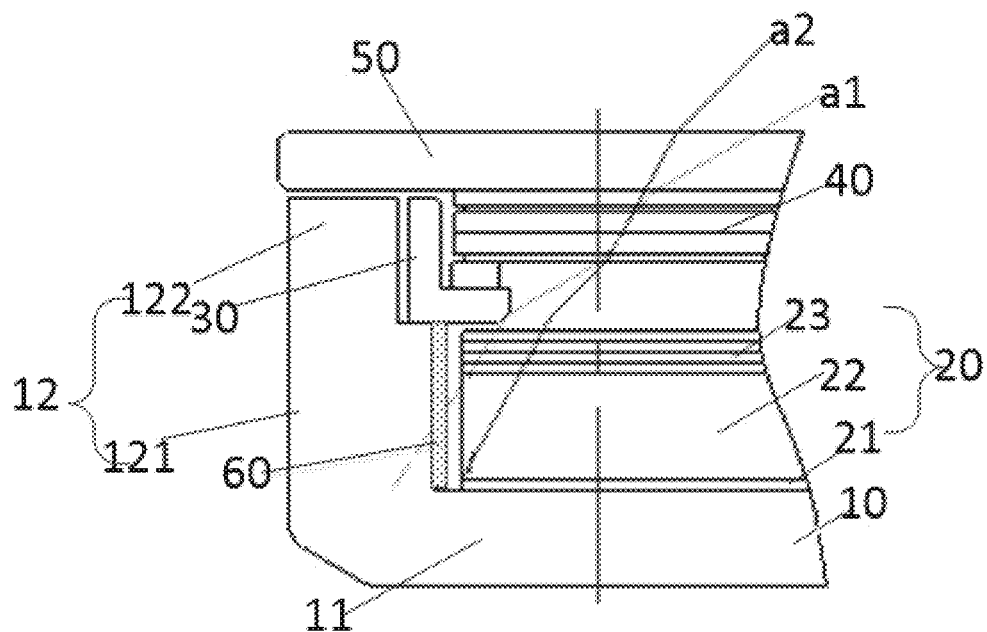
FIG. 7 is the first partial sectional view of a display module according to the fourth embodiment of the present invention.
Figure 8:
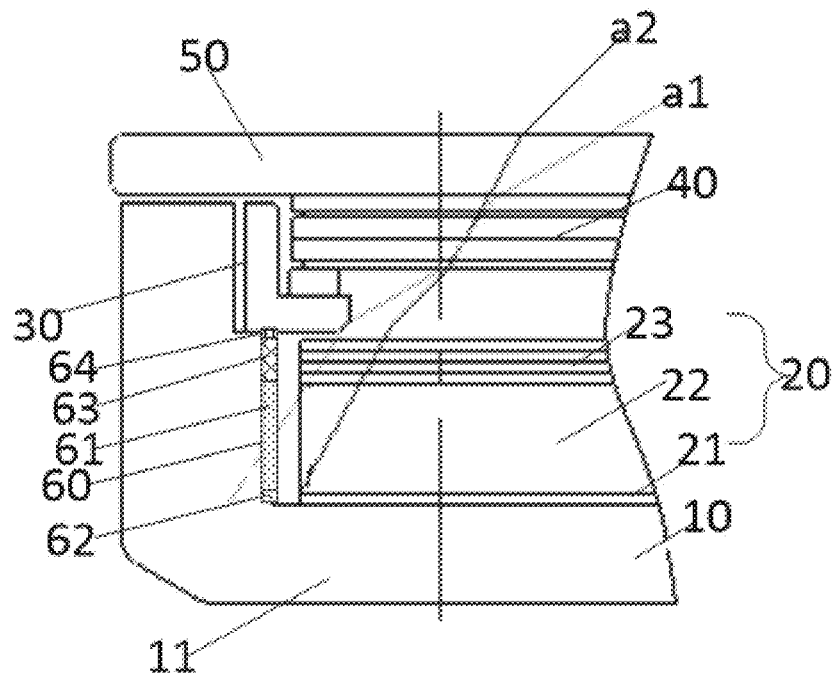
FIG. 8 is the second partial sectional view of a display module according to the fourth embodiment of the present invention.

Referring to FIG. 7 and FIG. 8, FIG. 7 is the first partial sectional view of a display module according to the fourth embodiment of the present invention.

As shown in FIG. 7 and FIG. 8, the difference between the present embodiment and the last embodiment is that the light-absorbing layer 60 according to the present embodiment covers the first sub-wall 121 distant from a side of the light source. That is, a light-absorbing layer 60 is also disposed at a position of the left side first sub-wall 121 not overlapped with the backlight module. In other words, a light-absorbing layer 60 is disposed on all the first sub-wall 121.

On the basis of the third embodiment, because a light path of all the place between the left side of the optical films and the first sub-wall is longer, hence disposing a light-absorbing layer also at a position of the first sub-wall not overlapped with the backlight module can further increase uniformity of light and further increase display effect. Wherein, a top portion of the light-absorbing layer 60 abuts a bottom portion of the middle frame 30, and a bottom portion of the light-absorbing layer 60 abuts a top portion of the bottom plate 11 of the housing 10. It can naturally be understood that the light-absorbing layer 60 can also cover the rest of the first sub-wall of the side wall.

As shown in FIG. 8, the light-absorbing layer 60 further includes a fourth sub-portion 64, that is, the fourth sub-portion 64 is located at the uppermost of the light-absorbing layer. A position of the fourth sub-portion 64 does not overlap a position of the backlight module 20, that is, the fourth sub-portion 64 corresponds to a position of a portion of the first sub-wall 121 higher than the backlight module 20, and a light-absorbing rate of the third sub-portion 63 is greater than or equal to a light-absorbing rate of the fourth sub-portion 64. Because a light path of a position where the first sub-wall does not overlap the backlight module is longer than a light path of a position corresponding to the left side of the optical films, hence configuring a light-absorbing rate of the fourth sub-portion's light-absorbing layer to be less than or equal to a light-absorbing rate of the third sub-portion's light-absorbing layer can better increase uniformity of light and better increase display effect.

It can be understood that the arrangement of the light-absorbing layer of an inner surface of the right side of the housing or of the upper and lower sides of the housing can be any one of the second embodiment to the fourth embodiment with an effect equivalent to that of the light-absorbing layer on the left side, which therefore can better prevent a phenomenon of light leakage when watching at wider visual angles (a1, a2) and further increase display effect.

The present invention further provides an electronic device that includes any one of the above-mentioned display modules.

A display module and electronic device according to the present invention dispose a light-absorbing layer at least at an inner surface of a first side of the housing, given the position of the light-absorbing layer corresponds at least to that of the light guide plate, and because the backlight module has more light on the side distant from the light source, disposing a light-absorbing layer at this place can decrease the amount of light that gathers, which prevents a phenomenon of light leakage when watching at wider visual angles and increases display effect.

In short, although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A display module, comprising:
 a backlight module comprising a light guide plate, a reflector, and a light source, wherein the reflector is located below the light guide plate, and the light source is disposed on one side of the light guide plate;
 a liquid crystal display panel disposed corresponding to the backlight module; and
 a housing, wherein an interior of the housing accommodates the backlight module and the liquid crystal display panel, a light-absorbing layer is disposed at least on an inner surface of a first side of the housing, and a position of the light-absorbing layer corresponds at least to a position of the light guide plate and a position of the reflector, wherein the first side is a side facing the light source and distant from the light source; and
 wherein the light-absorbing layer comprises a first sub-portion and a second sub-portion, a position of the first sub-portion corresponds to the position of the light guide plate, a position of the second sub-portion corresponds to the position of the reflector, and a light-absorbing rate of the first sub-portion is greater than a light-absorbing rate of the second sub-portion.

2. The display module as claimed in claim 1, wherein the light-absorbing layer is further disposed on an inner surface of a second side of the housing, wherein the second side is a side near to the light source.

3. The display module as claimed in claim 1, wherein the light-absorbing layer is further disposed on an inner surface of a light-absorbing sub-portion of a third side of the housing, wherein the third side is connected to the first side and the second side respectively.

4. The display module as claimed in claim 1, wherein the backlight module further comprises a plurality of optical films, the optical films are located above the light guide plate, and the position of the light-absorbing layer also corresponds to a position of the optical films.

5. The display module as claimed in claim 4, wherein the light-absorbing layer further comprises a third sub-portion, a position of the third sub-portion corresponds to the position of the optical films, and the light-absorbing rate of the second sub-portion is greater than or equal to a light-absorbing rate of the third sub-portion.

6. The display module as claimed in claim 1, wherein the display module further comprises a middle frame configured to support the liquid crystal display panel, and the middle frame is located on the backlight module;

the housing comprises a side wall, the side wall comprises a first sub-wall, a position of the first sub-wall corresponds to a position of the backlight module, a height of the first sub-wall is greater than a height of the backlight module, a bottom portion of the middle frame abuts a top portion of the first sub-wall, and the light-absorbing layer covers the first sub-wall.

7. The display module as claimed in claim 6, wherein the housing further comprises a bottom plate, one end of the side wall is connected to an end portion of the bottom plate, the bottom plate is located below the backlight module, a top portion of the light-absorbing layer abuts the bottom portion of the middle frame, and a bottom portion of the light-absorbing layer abuts a top portion of the bottom plate.

8. The display module as claimed in claim 1, wherein a thickness of the light-absorbing layer is less than or equal to 0.1 millimeters.

9. An electronic device comprising a display module that comprises:

a backlight module comprising a light guide plate, a reflector, and a light source, wherein the reflector is located below the light guide plate, and the light source is disposed on one side of the light guide plate;

a liquid crystal display panel disposed corresponding to the backlight module; and a housing, wherein an interior of the housing accommodates the backlight module and the liquid crystal display panel, a light-absorbing layer is disposed at least on an inner surface of a first side of the housing, and a position of the light-absorbing layer corresponds at least to a position of the light guide plate and a position of the reflector, wherein the first side is a side facing the light source and distant from the light source; and wherein the light-absorbing layer comprises a first sub-portion and a second sub-portion, a position of the first sub-portion corresponds to the position of the light guide plate, a position of the second sub-portion corresponds to the position of the reflector, and a light-absorbing rate of the first sub-portion is greater than a light-absorbing rate of the second sub-portion.

10. The electronic device as claimed in claim 9, wherein the light-absorbing layer is further disposed on an inner surface of a second side of the housing, wherein the second side is a side near to the light source.

11. The electronic device as claimed in claim 9, wherein the light-absorbing layer is further disposed on an inner surface of a light-absorbing sub-portion of a third side of the housing, wherein the third side is connected to the first side and the second side respectively.

12. The electronic device as claimed in claim 9, wherein the backlight module further comprises a plurality optical films, the optical films are located above the light guide plate, and the position of the light-absorbing layer also corresponds to a position of the optical films.

13. The electronic device as claimed in claim 12, wherein the light-absorbing layer further comprises a third sub-portion, a position of the third sub-portion corresponds to the position of the optical films, and the light-absorbing rate of the second sub-portion is greater than or equal to a light-absorbing rate of the third sub-portion.

14. The electronic device as claimed in claim 9, wherein the display module further comprises a middle frame configured to support the liquid crystal display panel, and the middle frame is located on the backlight module;

the housing comprises a side wall, the side wall comprises a first sub-wall, a position of the first sub-wall corresponds to a position of the backlight module, a height of the first sub-wall is greater than a height of the backlight module, a bottom portion of the middle frame abuts a top portion of the first sub-wall, and the light-absorbing layer covers the first sub-wall.

15. The electronic device as claimed in claim 14, wherein the housing further comprises a bottom plate, one end of the side wall is connected to an end portion of the bottom plate, the bottom plate is located below the backlight module, a top portion of the light-absorbing layer abuts the bottom portion of the middle frame, and a bottom portion of the light-absorbing layer abuts a top portion of the bottom plate.

16. The electronic device as claimed in claim 9, wherein a thickness of the light-absorbing layer is less than or equal to 0.1 millimeters.

* * * * *